United States Patent
Li

(10) Patent No.: US 12,004,157 B2
(45) Date of Patent: Jun. 4, 2024

(54) METHOD AND APPARATUS FOR OPERATING DRX TIMER, DEVICE AND STORAGE MEDIUM

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 388 days.

(21) Appl. No.: 17/431,698

(22) PCT Filed: Feb. 18, 2019

(86) PCT No.: PCT/CN2019/075411
§ 371 (c)(1),
(2) Date: Aug. 17, 2021

(87) PCT Pub. No.: WO2020/168458
PCT Pub. Date: Aug. 27, 2020

(65) Prior Publication Data
US 2022/0124765 A1    Apr. 21, 2022

(51) Int. Cl.
*H04W 72/1273* (2023.01)
*H04W 52/02* (2009.01)
(Continued)

(52) U.S. Cl.
CPC ..... *H04W 72/1273* (2013.01); *H04W 72/044* (2013.01); *H04W 72/23* (2023.01); *H04W 76/28* (2018.02)

(58) Field of Classification Search
CPC ............. H04W 72/12; H04W 72/1221; H04W 72/1273; H04W 76/20; H04W 76/28;
(Continued)

(56) References Cited

U.S. PATENT DOCUMENTS

| 11,558,921 B2 * | 1/2023 | Hwang | H04W 76/28 |
| 2004/0076137 A1 * | 4/2004 | Seurre | H04W 76/28 |
| | | | 370/352 |

(Continued)

FOREIGN PATENT DOCUMENTS

| CN | 102761942 A | 10/2012 |
| CN | 102932822 A | 2/2013 |

(Continued)

OTHER PUBLICATIONS

International Search Report of PCT Application No. PCT/CN2019/075411 dated Nov. 19, 2019 with English translation, (4p).

(Continued)

*Primary Examiner* — Jenee Holland
(74) *Attorney, Agent, or Firm* — Arch & Lake LLP

(57) ABSTRACT

A method and a terminal for running a DRX timer are provided. The method includes: determining a first Discontinuous Reception (DRX) parameter corresponding to a first Band Width Part (BWP); running a first DRX timer corresponding to the first BWP according to the first DRX parameter; and in response to determining a switching from the first BWP to a second BWP, continuously validating the first DRX timer in an operation state to the second BWP.

19 Claims, 11 Drawing Sheets

(51) Int. Cl.
*H04W 72/044* (2023.01)
*H04W 72/0453* (2023.01)
*H04W 72/23* (2023.01)
*H04W 76/28* (2018.01)

(58) Field of Classification Search
CPC ... H04W 72/04; H04W 72/044; H04W 72/20; H04W 72/23
See application file for complete search history.

(56) References Cited

U.S. PATENT DOCUMENTS

| | | | | |
|---|---|---|---|---|
| 2010/0144299 | A1* | 6/2010 | Ren | H04W 52/0232 |
| | | | | 455/226.1 |
| 2012/0113825 | A1* | 5/2012 | Baglin | H04W 24/00 |
| | | | | 370/252 |
| 2013/0016638 | A1* | 1/2013 | Lee | H04W 52/0251 |
| | | | | 370/311 |
| 2014/0056198 | A1 | 2/2014 | Quan et al. | |
| 2014/0301373 | A1* | 10/2014 | Cili | H04L 67/62 |
| | | | | 370/336 |
| 2018/0288746 | A1 | 10/2018 | Zhang et al. | |
| 2019/0044811 | A1 | 2/2019 | Miao et al. | |
| 2020/0053825 | A1* | 2/2020 | Hwang | H04W 76/28 |
| 2020/0092073 | A1* | 3/2020 | Papasakellariou | H04L 5/0053 |
| 2020/0214078 | A1* | 7/2020 | Jiang | H04W 52/0216 |
| 2020/0229089 | A1* | 7/2020 | Tang | H04L 5/001 |
| 2021/0360674 | A1* | 11/2021 | Lim | H04L 5/0098 |
| 2022/0182940 | A1* | 6/2022 | Shi | H04W 72/044 |

FOREIGN PATENT DOCUMENTS

| | | |
|---|---|---|
| CN | 108093495 A | 5/2018 |
| CN | 108260214 A | 7/2018 |
| CN | 109076552 A | 12/2018 |
| CN | 109309950 A | 2/2019 |
| EP | 2997753 A1 | 3/2016 |
| IN | 201647034090 A | 11/2016 |
| JP | 2014207533 A | 10/2014 |
| WO | 2018190678 A1 | 10/2018 |

OTHER PUBLICATIONS

Oppo, APT, Qualcomm, Huawei, HiSilicon, "UE behaviour on DRX timer operation", 3GPP TSG-RAN2 #101, R2-1801758 (resubmission of R2-1800073), Athens, Greece, Feb. 26-Mar. 2, 2018, (7p).
Nokia, Nokia Shanghai Bell, "RRM TC 20B: EN-DC interruptions due to active BWP switching (DCI- and timer-based switch)", 3GPP TSG-RAN WG4 Meeting #88bis, R4-1813211, Chengdu, China, Oct. 8-12, 2018, (10p).
Oppo, "BWP operation enhancements for power saving" 3GPP TSG-RAN WG2 Meeting #105, R2-181xxxx, Athens, Greece, Feb. 25-Mar. 1, 2019, (3p).
Oppo, et al., "The impacts of BWP switch delay" 3GPP TSG-RAN WG2 Meeting #104, R2-1816252, Spokane, USA, Nov. 12-16, 2018, Revision of R2-1813593, (6p).
Xiaomi Communications, "Considerations on UE power saving for C-DRX" 3GPP TSG-RAN2# 105, R2-1901914, Athens, Greece, Feb. 25-Mar. 1, 2019, (7p).
Qualcomm Incorporated, "Potential Techniques for UE Power Saving" 3GPP TSG-RAN WG1 #96, R1-1903016, Athens, Greece, Feb. 25-Mar. 1, 2019, (33p).
Extended European Search Report issued in Application No. 19916494.8, dated Aug. 19, 2022, (6p).
INOA of Application No. 202147041966 dated on Jun. 21, 2022 with English translation, (5p).
Written Opinion of the International Search Authority issued on Nov. 19, 2019 of Application No. PCT/CN2019/075411,(4p).

* cited by examiner

METHOD AND APPARATUS FOR OPERATING DRX TIMER, DEVICE AND STORAGE MEDIUM

CROSS-REFERENCE TO RELATED APPLICATION

This application is the U.S. national phase application of International Application No. PCT/CN2019/075411, filed on Feb. 18, 2019, the entire contents of which are incorporated herein by reference for all purposes.

TECHNICAL FIELD

The present disclosure relates to the field of communications, and particularly, to a method and an apparatus for running a Discontinuous Reception (DRX) timer, a device and a storage medium.

BACKGROUND

Discontinuous Reception (DRX) is a mechanism that allows a terminal to periodically enter a dormant state and stop monitoring a Physical Downlink Control Channel (PDCCH) scheduling information (or referred to as PDCCH subframe). In the DRX mechanism, a base station configures DRX parameters for the terminal, and the DRX parameters are used to start a DRX timer. The DRX timer is configured to adjust a PDCCH monitoring duration when the terminal performs DRX, so as to meet service delay requirements.

In New Radio (NR), a carrier bandwidth is divided into multiple Band Width Parts (BWPs), that is, one terminal is configured with multiple BWPs. The terminal performs BWP switching according to service characteristics, and runs the DRX timer on the BWPs to ensure timeliness of data transmission.

SUMMARY

The present disclosure provides a method and an apparatus for running a DRX timer, a device, and a storage medium, which may solve the problem that, in a scenario where each BWP is configured with its respective DRX parameter, when a terminal performs BWP switching, a data transmission delay may be caused by possible incoordination of DRX parameters respectively corresponding to two BWPs. The technical solutions are as follows.

According to a first aspect of the present disclosure, a method for running a DRX timer is provided. The method is applied to a scenario where a first BWP and a second BWP have different DRX parameters.

The method includes that a first DRX parameter corresponding to the first BWP is determined. Additionally, the method includes that a first DRX timer corresponding to the first BWP is run according to the first DRX parameter. Furthermore, in response to determining that the first BWP is switched to the second BWP, the first DRX timer in a running state continues to be validated to the second BWP.

According to a second aspect of the present disclosure, a terminal is provided. The terminal includes a processor, a non-transitory storage coupled to the processor and a plurality of programs stored in the non-transitory storage. The plurality of programs, when executed by the processor, cause the processor to determine a first DRX parameter corresponding to the first BWP, where the first BWP and a second BWP have different DRX parameters. The processor is further caused to: run a first DRX timer corresponding to the first BWP according to the first DRX parameter, and in response to determining that the first BWP is switched to a second BWP, allow the first DRX timer in a running state to continue to be validated to the second BWP.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure as recited in the appended claims.

In NR, a carrier bandwidth is divided into multiple BWPs, that is, one terminal is configured with multiple BWPs. However, the terminal can only have at most one activated downlink BWP and one activated uplink BWP on a cell at the same time (for a cell with two uplink carriers, the terminal can have two activated uplink BWPs at the same time, i.e., each uplink carrier has a respective uplink BWP). If the terminal is configured with multiple carriers, and each carrier can have a respective activated uplink BWP and a respective downlink BWP. For a paired spectrum (e.g., Frequency Division Duplexing (FDD)) including an uplink carrier and a downlink carrier, the uplink BWP and the downlink BWP are independently configured; for an unpaired spectrum (e.g., Time Division Duplexing (TDD) including an uplink carrier and a downlink carrier, the uplink BWP and the downlink BWP are the same.

NR supports a function that the activated downlink BWP automatically falls back to a default BWP or an initial BWP after a period of inactivity. A network can configure an initial BWP, a default BWP, and a BWP Inactivity Timer for each cell of the terminal. If a cell is configured with a BWP inactivity timer, which means that the function of automatically falling back to the default BWP or the initial BWP is enabled. When the function is enabled, a current activated BWP on the cell is inactive for a period of time, so that the BWP inactivity timer is started, and the activated cell automatically falls back to the default BWP. If the cell is not configured with the default BWP, it falls back to the initial BWP. The default BWP is a BWP with a small bandwidth, for saving power.

Figure 1:
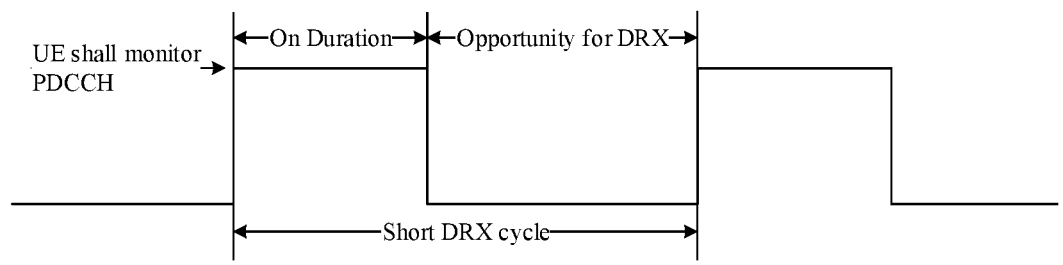
FIG. 1 is a schematic diagram of a DRX cycle.

In a DRX mechanism, a terminal is configured with a DRX cycle. Referring to FIG. 1, a schematic diagram of a DRX cycle is illustrated. The DRX cycle is composed of "On Duration" and "Opportunity for DRX". Within a time of On Duration, the terminal monitors and receives PDCCH scheduling information; within a time of Opportunity for DRX, the terminal does not receive data of a downlink channel to save power consumption. It can be seen from FIG. 1 that in time domain, time is divided into successive DRX cycles. When receiving a scheduling message in the time of On Duration, the terminal starts a "DRX Inactivity Timer" and monitors the PDCCH scheduling information in each subframe during this period; under the circumstance that the DRX inactivity timer is running, even if the originally configured time of On Duration is ended, the terminal still needs to continue to monitor downlink PDCCH subframes until the DRX inactivity timer expires.

Figure 2:
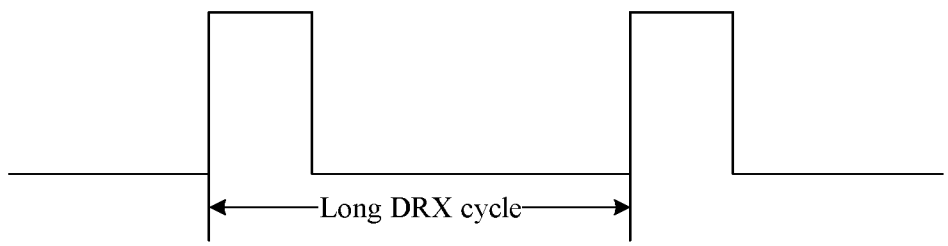
FIG. 2 is a schematic diagram of a DRX cycle.

A DRX cycle is equal to the sum of a wake-up time and a dormant time of User Equipment (UE). The wake-up time is a duration of On Duration in one cycle, and the dormant time is a duration of Opportunity for DRX in one cycle. In a communication system, according to different business scenarios, the terminal is configured with a short cycle as shown in FIG. 1, or a long cycle as shown in FIG. 2. The dormant time of a long cycle is longer than that of a short cycle, or, a duration of Opportunity for DRX of a long cycle accounts for a larger proportion than a duration of Opportunity for DRX of a short cycle. After the DRX inactivity timer expires, if the terminal is configured with a short cycle, the terminal enters the short cycle, otherwise, it enters a long cycle. For a scenario with configuration of a short cycle, after the DRX inactivity timer expires, a behavior of the terminal entering a short cycle is usually because the network sends a series of small data packets after sending a large data packet. For example, for non-real-time services such as web browsing, a home page is downloaded, followed by a series of small objects. Therefore, it can be considered a high active state for a short period.

DRX is configured with DRX parameters. The DRX parameters are semi-statically configured according to high-level signaling, and refer to parameters of each Media Access Control (MAC) entity. The DRX parameters are used to start the DRX timer. The DRX timer includes a DRX On Duration Timer, a DRX inactivity timer, a DRX short cycle Timer, a DRX Retransmission Timer, and a DRX Hybrid Automatic Repeat request Round-Trip Time (DRX HARQ RTT Timer).

A base station configures multiple BWPs to the terminal, and the terminal performs BWP switching according to business characteristics. However, when the base station configures only a set of DRX parameters for multiple BWPs according to the entire cell, unnecessary power consumption may be caused, so that the base station configures a respective set of DRX parameters to each BWP.

For a scenario where each BWP is configured with its respective DRX parameter, for example, a first BWP corresponds to a first DRX parameter, a second BWP corresponds to a second DRX parameter, and when the terminal switches from the first BWP to the second BWP, there is a problem of incoordination between the first DRX parameter and the second DRX parameter. For example, if a bandwidth of the second BWP is greater than a bandwidth of the first BWP, when working on the first BWP, due to arrival of a large amount of new data, the terminal monitors the PDCCH scheduling information to start a DRX inactivity timer, the terminal is allowed to switch from the first BWP to the second BWP through a network, the second DRX parameter is exactly in the time of Opportunity for DRX by data calculation; if the terminal stops the DRX inactivity timer of the first DRX parameter and works on the second BWP according to the second DRX parameter, that is, the terminal enters Opportunity for DRX and needs to wait for the next On Duration; however, this mode may cause a large delay, and does not achieve the purpose of allowing the terminal to switch to the second BWP to accelerate data transmission.

The embodiments of the present disclosure provide a method and an apparatus for running a DRX timer, a device, and a storage medium, which are applicable to a scenario where each BWP is configured with its respective DRX parameter. The DRX parameter is used to start a DRX timer that is set according to the DRX parameter. When the first BWP is switched to the second BWP, a first DRX timer corresponding to the first BWP continues to be validated to the second BWP, thereby solving the potential problem that the DRX parameters may be uncoordinated when the terminal performs BWP switching.

Figure 3:
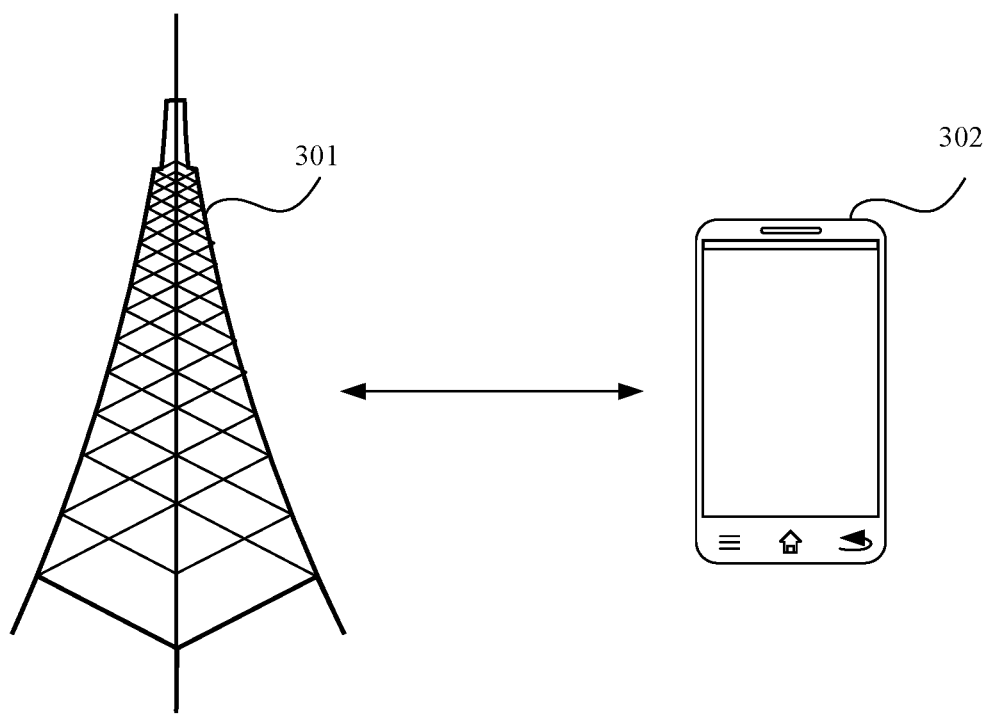
FIG. 3 is a schematic diagram of a communication system according to an embodiment of the present disclosure.

FIG. 3 is a schematic diagram of a communication system according to an embodiment of the present disclosure. In FIG. 3, an access network device 301 and a terminal 302 are included.

The access network device 301 is a device deployed in an access network to provide a wireless communication function for the terminal 302. The access network device 301 may include various types of macro base stations, micro base stations, relay stations, access points, and the like. In systems adopting different wireless access technologies, the names of devices having access network device functions may be different. For example, in a 5G NR system, the device is referred to as gNodeB or gNB. Alternatively, the access network device 301 is used to configure multiple BWPs to the terminal 302, and each BWP is configured with its respective DRX parameter.

Usually, the number of terminals 302 may be multiple. One or more terminals 302 may be distributed in a cell managed by each base station 301. The terminals 302 may include various handheld devices, on-board devices, wearable devices and computing devices, which have wireless communication functions, and other processing devices connected to a wireless modem, as well as various types of User Equipment (UE), Mobile Stations (MS), terminal devices, and the like, Alternatively, the terminal 302 is used to receive multiple BWPs configured by the access network device 301 and the corresponding DRX parameter configured for each BWP.

The technical solutions described in the embodiments of the present disclosure may be applicable to an NR system, and may also be applicable to a subsequent evolution system of the NR system.

Figure 4:
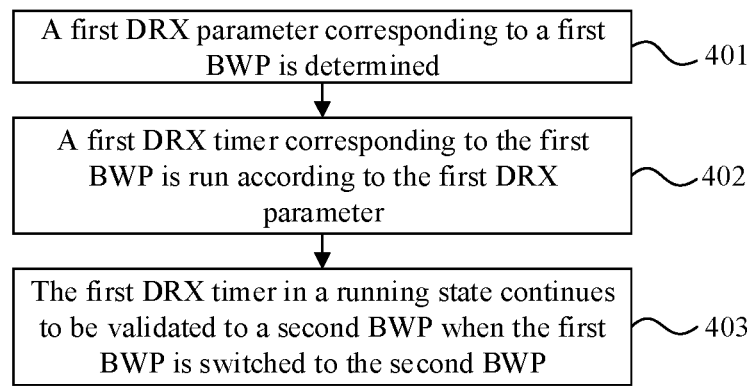
FIG. 4 is a flowchart of a method for running a DRX timer according to an embodiment of the present disclosure.

FIG. 4 is a flowchart of a method for running a DRX timer according to an embodiment of the present disclosure. The method is applied to a scenario where a first BWP and a second BWP have different DRX parameters. The method is applied to an implementation environment shown in FIG. 3, and includes the following steps.

In 401, a first DRX parameter corresponding to the first BWP is determined.

The first BWP corresponds to the first DRX parameter, and the first DRX parameter is a parameter for a terminal to monitor PDCCH scheduling information on the first BWP.

The terminal monitors the PDCCH scheduling information on the first BWP according to the determined first DRX parameter.

In 402, a first DRX timer corresponding to the first BWP is run according to the first DRX parameter.

The first DRX parameter is configured to start the first DRX timer. Alternatively, the first DRX timer includes at least one of a first DRX inactivity timer, a first DRX HARQ RTT timer, a first DRX retransmission timer, or a first DRX On Duration timer.

According to setting of the first DRX parameter, when monitoring the PDCCH scheduling information on the first BWP, the terminal runs a first DRX timer corresponding to the first BWP.

In 403, when the first BWP is switched to a second BWP, the first DRX timer in a running state continues to be validated to the second BWP.

The terminal performs BWP switching according to a switching instruction sent by an access network device, so as to switch from the first BWP to the second BWP. Alternatively, the switching instruction includes Downlink Control Information (DCI) carried on a PDCCH.

Alternatively, under the circumstance that the second BWP corresponds to a second DRX parameter that is different from the first DRX parameter, when the terminal switches from the first BWP to the second BWP, the first DRX timer in a running state continues to be validated to the second BWP. The first DRX timer is a timer corresponding to the first BWP.

In summary, in the method provided in the embodiment of the present disclosure, when the terminal switches from the first BWP to the second BWP, the first DRX timer in a running state continues to be validated to the second BWP, so that the terminal can avoid the problem of data transmission delay caused by incoordination of the DRX parameters that respectively correspond to the two BWPs when performing BWP switching, thereby ensuring timeliness of data transmission during BWP switching.

Figure 5:
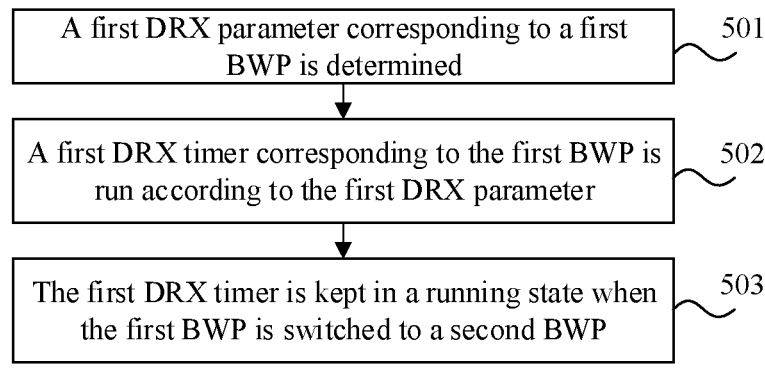
FIG. 5 is a flowchart of a method for running a DRX timer according to another embodiment of the present disclosure.

FIG. 5 is a flowchart of a method for running a DRX timer according to another embodiment of the present disclosure. The method is applied to a scenario where a first BWP and a second BWP have different DRX parameters. The method is applied to the implantation environment shown in FIG. 3, and includes the following steps.

In 501, a first DRX parameter corresponding to the first BWP is determined.

The first BWP corresponds to the first DRX parameter, and the first DRX parameter is configured by an access network device according to the first BWP, and is used for a terminal to monitor a DRX parameter of PDCCH scheduling information on the first BWP.

When monitoring the PDCCH scheduling information on the first BWP, the terminal determines the first DRX parameter corresponding to the first BWP.

In 502, a first DRX timer corresponding to the first BWP is run according to the first DRX parameter.

The first BWP corresponds to the first DRX timer. The first DRX parameter includes a startup setting and a cycle setting of the first DRX timer. The startup setting is used for indicating when the first DRX timer starts to run, and the cycle setting is used for indicating a running duration, after each startup, of the first DRX timer.

Alternatively, the first DRX timer includes at least one of a first DRX inactivity timer, a first DRX HARQ RTT timer, a first DRX retransmission timer, or a first DRX On Duration timer.

The terminal determines the startup setting and the cycle setting of the first DRX timer according to the first DRX parameter, and runs the first DRX timer on the first BWP according to the startup setting and the cycle setting.

In 503, the first DRX timer is kept in a running state when the first BWP is switched to the second BWP.

After receiving a switching instruction sent by the access network device, the terminal switches from the first BWP to the second BWP, and determines a second DRX parameter that corresponds to the second BWP. Due to a difference between the first DRX parameter and the second DRX parameter, when the terminal switches from the first BWP to the second BWP, the first DRX timer is kept in a running state. Alternatively, the switching instruction includes DCI carried on a PDCCH.

Alternatively, when the terminal switches from the first BWP to the second BWP, a continuous validating mode of the first DRX timer is determined according to at least one of a duration of the first DRX timer, a duration of the second DRX timer, or a running duration of the first DRX timer when switching is successful.

Alternatively, when the first DRX timer refers to a first DRX inactivity timer, the terminal achieves the purpose of keeping the first DRX inactivity timer continuously validated according to any one of a first mode, a second mode, a third mode, or a fourth mode among the following six modes.

Or, when the first DRX timer refers to a first DRX HARQ RTT timer, the terminal achieves the purpose of keeping the first DRX HARQ RTT timer continuously validated according to any one of a first mode, a second mode, or a third mode among the following six modes.

Or, when the first DRX timer refers to a first DRX retransmission timer, the terminal achieves the purpose of keeping the first DRX retransmission timer continuously validated according to any one of a first mode, a second mode, or a third mode among the following six modes.

Or, when the first DRX timer refers to a first DRX On Duration timer, the terminal achieves the purpose of keeping the first DRX On Duration timer continuously validated according to any one of a first mode, a fifth mode, or a sixth mode among the following six modes.

Alternatively, the continuous validating mode of the first DRX timer may be any one of the following six modes.

Figure 6:
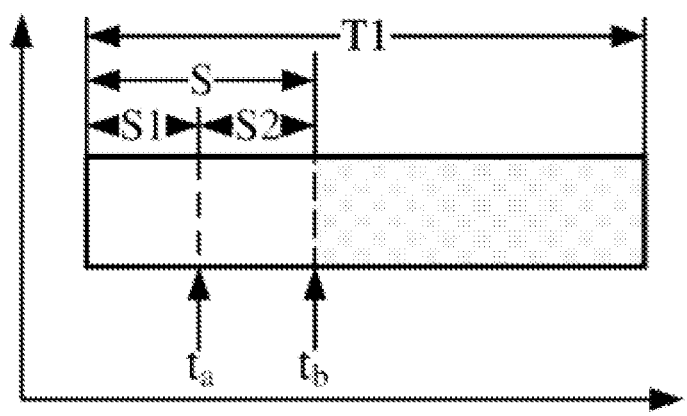
FIG. 6 is a schematic diagram of a DRX timer keeping in a running state during BWP switching according to another embodiment of the present disclosure.

The first mode: FIG. 6 is a schematic diagram showing a DRX timer keeping in a running state during BWP switching.

A duration of the first DRX timer is set as T1, the duration T1 of the first DRX timer is determined according to the first DRX parameter corresponding to the first BWP. The terminal receives a BWP switching instruction at a time instant $t_a$, and the BWP switching instruction indicates to switch from the first BWP to the second BWP. The terminal successfully switches from the first BWP to the second BWP at a time instant $t_b$. That is, the BWP switching process takes a time S2, and a running duration when the terminal successfully switches to the second BWP is S=S1+S (S2=$t_a$-$t_b$).

When the terminal switches from the first BWP to the second BWP, the first DRX timer is kept in a running state. After the terminal switches to the second BWP, the first DRX timer continues to be kept in a running state until timeout. Alternatively, a remaining duration of the first DRX timer is equal to (T1−S).

For example, the duration of the first DRX timer is 10 ms, the first DRX timer takes 3 ms during BWP switching, when the first BWP is switched to the second BWP, the running duration of the first DRX timer is 3 ms when switching of the first DRX timer is successful, the first DRX timer continues to keep in a running state for 7 ms after the terminal switches to the second BWP, and the first DRX timer runs overtime.

That is, the terminal receives the switching instruction at the time instant $t_a$ to perform BWP switching, and the switching is successful at the time instant $t_b$. The terminal runs the first DRX timer on the first BWP according to the first DRX parameter, the running duration of the first DRX timer before the switching is S1, the running duration of the first DRX timer when the switching is successful after the switching instruction is received is S2 (S2=$t_b$-$t_a$), the running duration of the first DRX timer when the switching is successful is S=S1+S2, and thus the remaining duration of the first DRX timer is equal to (T1−S1−S2).

Figure 7:
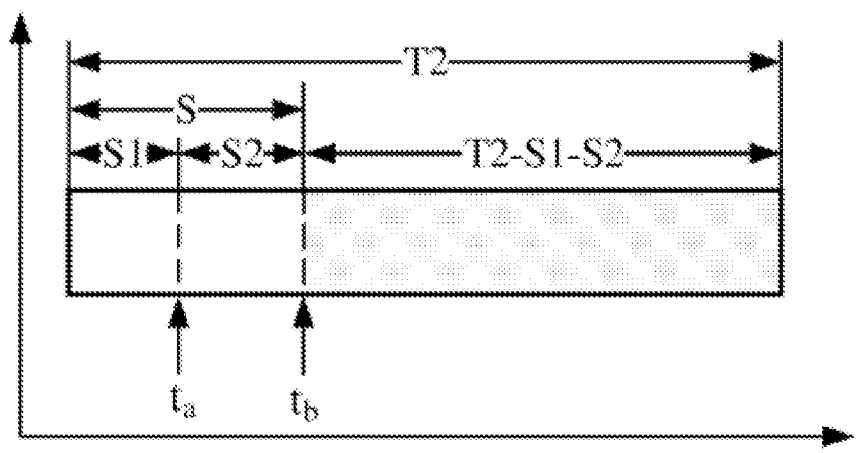
FIG. 7 is a schematic diagram of a DRX timer keeping in a running state during BWP switching according to yet another embodiment of the present disclosure.

The second mode: FIG. 7 is another schematic diagram showing a DRX timer keeping in a running state during BWP switching.

A duration of the second DRX timer is set as T2, and the duration T2 of the second DRX is determined according to a second DRX parameter corresponding to the second BWP.

When the terminal switches from the first BWP to the second BWP, the first DRX timer is kept in a running state, and a running duration of the first DRX timer when the switching is successful is S, where S is less than T2. A remaining duration of the first DRX timer after the switching is successful is determined according to a second DRX parameter corresponding to the second BWP.

Alternatively, the remaining duration of the first DRX timer after the switching is successful is equal to (T2−S).

Illustratively, the terminal runs the first DRX timer on the first BWP according to the first DRX parameter, the terminal receives a BWP switching instruction at a time instant $t_a$, and the BWP switching instruction indicates to switch from the first BWP to the second BWP. The terminal successfully switches from the first BWP to the second BWP at a time instant $t_b$. That is, the terminal takes a time S1 before receiving the BWP switching instruction, the BWP switching process takes a time S2, and a running duration when the terminal successfully switches to the second BWP is S=S1+S2 (S2=$t_a$-$t_b$). When the terminal successfully switches to the second BWP, the remaining duration of the first DRX timer is set to (T2−S1−S2).

For example, the duration of the first DRX timer is 20 ms, when the first DRX timer switches from the first BWP to the second BWP, the running duration of the first DRX timer is 3 ms, and the remaining duration of the first DRX timer continuing to keep in a running state is 17 ms after the terminal switches to the second BWP.

Figure 8:
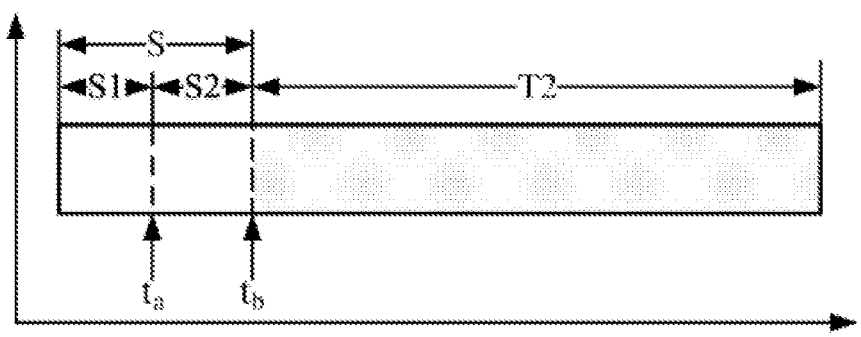
FIG. 8 is a schematic diagram of a DRX timer keeping in a running state during BWP switching according to still another embodiment of the present disclosure.

The third mode: FIG. 8 is another schematic diagram showing a DRX timer keeping in a running state during BWP switching.

A duration of the second DRX timer is set as T2, and the duration T2 of the second DRX timer is determined according to a second DRX parameter corresponding to the second BWP.

When the terminal switches from the first BWP to the second BWP, a running duration of the first DRX timer when the switching is successful is S. After successfully switching to the second BWP, the terminal restarts the first DRX timer, a duration of the restarted first DRX timer being equal to a second duration T2 that is determined according to a second DRX parameter corresponding to the second BWP.

Alternatively, after the terminal switches to the second BWP, the first DRX timer is restarted, a duration of the restarted first DRX timer is set as a second duration, and the second duration is the duration T2 of the second DRX timer determined according to the second DRX parameter. That is, the duration of the restarted first DRX timer is equal to T2.

For example, the duration of the second DRX timer is 20 ms, and the running duration of the first DRX timer is 3 ms when the first DRX timer successfully switches from the first BWP to the second BWP; after the terminal switches to the second BWP, the first DRX timer is restarted, and the duration of the restarted first DRX timer is 20 ms.

The fourth mode: In a case that the first DRX timer is a first DRX inactivity timer, when switching from the first BWP to the second BWP, the terminal keeps the first DRX inactivity timer in a running state, and monitors PDCCH before timeout.

When a scheduling grant is detected, the terminal starts a second DRX inactivity timer corresponding to the second BWP. A duration of the second DRX inactivity timer is equal to a second duration that is determined according to a second DRX parameter corresponding to the second BWP.

The fifth mode: In a case that the first DRX timer is a first DRX On Duration timer, when the terminal switches from the first BWP to the second BWP, the first DRX On Duration timer is kept in a running state.

When existence conditions of a second DRX On Duration timer that is started according to a second DRX parameter before timeout are met, a remaining duration of the first DRX On Duration timer is determined according to the second DRX parameter corresponding to the second BWP, and the second DRX parameter is a DRX parameter corresponding to the second BWP.

Alternatively, a remaining duration of the first DRX On Duration timer=(a duration, in the second DRX parameter, of the second DRX On Duration timer minus a running duration of the first DRX On Duration timer when the switching is successful). The successful switching means that the first BWP is successfully switched to the second BWP.

In the fifth continuous validating mode of the first DRX On Duration timer described, the remaining duration of the first DRX On Duration timer may be obtained through the schematic diagram shown in FIG. 7. The specific obtaining manner may refer to the second continuous validating mode described, which will not be elaborated here.

The sixth mode: In a case that the first DRX timer is a first DRX On Duration timer, when the terminal switches from the first BWP to the second BWP, the first DRX On Duration timer is kept in a running state.

When existence conditions of a second DRX On Duration timer that is started according to a second DRX parameter before timeout are met, the first DRX On Duration timer is restarted, and a duration of the restarted first DRX On Duration timer is equal to a third duration. The third duration is determined according to a second DRX parameter corresponding to the second BWP and a running duration, the running duration is a running duration of the first DRX On Duration timer before restarting, and the second DRX parameter is a DRX parameter corresponding to the second BWP.

Alternatively, a duration of the restarted first DRX On Duration timer=(a duration, in the second DRX parameter, of the second DRX On Duration timer minus a running duration of the first DRX On Duration timer when the switching is successful).

For example, the duration of the second DRX timer is 20 ms, the first DRX timer takes 3 ms during BWP switching, and when the first DRX timer switches from the first BWP to the second BWP, the running duration of the first DRX timer is 3 ms when switching of the first DRX timer is successful; after the terminal switches to the second BWP, the first DRX timer is restarted, and the duration of the restarted first DRX timer is 17 ms.

Alternatively, the continuous validating modes of the first DRX timer include, but are not limited to the above modes, which are not limited in the embodiments.

Alternatively, the terminal obtains the continuous validating mode of the first DRX timer in any one of the following three manners.

The first manner: A continuous validating mode of the first DRX timer is pre-configured by an access network device through broadcast signaling or dedicated signaling, and is sent to the terminal by the access network device.

The second manner: A continuous validating mode of the first DRX timer is predefined, that is, the continuous validating mode of the first DRX timer is specified according to a communication protocol, and the terminal obtains the continuous validating mode of the first DRX timer according to the provision of the communication protocol.

The third manner: A switching instruction sent by the access network device to the terminal carries a continuous validating mode of the first DRX timer. After receiving the switching instruction, the terminal obtains the continuous validating mode of the first DRX timer according to the switching instruction.

Alternatively, the manner in which the terminal acquires the continuous validating mode of the first DRX timer includes, but is not limited to the above three manners, which is not limited in the embodiments.

In summary, in the method provided in the embodiment of this disclosure, when switching from the first BWP to the second BWP, the terminal keeps the first DRX timer in a running state until timeout, so that the steps of BWP switching are completed before the first DRX timer expires, thereby ensuring continuity of monitoring the PDCCH during the BWP switching, and avoiding the delay of data transmission.

In the method provided in the embodiment of this disclosure, when the terminal switches from the first BWP to the second BWP, the remaining duration of the first DRX timer is determined according to the second DRX parameter, so that in a scenario where both BWP switching and data transmission are performed, the data transmission will not be delayed due to incoordination between two sets of DRX parameters.

In the method provided in the embodiment of the present disclosure, when switching from the first BWP to the second BWP, the terminal restarts the first DRX timer, and sets the duration of the restarted first DRX timer to the duration of the second DRX timer corresponding to the second BWP, so that in a scenario where both BWP switching and data transmission are performed, the continuity of monitoring the PDCCH is ensured, and the problems of delay of data transmission and loss of data transmission are avoided.

In the method provided in the embodiment of the present disclosure, in a case that the first DRX timer is a first DRX inactivity timer, when switching from the first BWP to the second BWP, the terminal keeps the first DRX inactivity timer to continuously monitor the PDCCH before timeout, and when the scheduling grant is detected, starts the second DRX timer, so that the PDCCH is continuously monitored by the first DRX timer before timeout, thereby ensuring timely monitoring of the scheduling grant, and avoiding loss or delay of data transmission.

In the method provided in the embodiment of the present disclosure, in a case that the first DRX timer is a first DRX On Duration timer, when conditions of a second DRX On Duration timer that is started according to a second DRX parameter are met before the first DRX On Duration timer expires, the first DRX On Duration timer continues to be validated, so that when the BWP switching are completed and before the first DRX On Duration timer expires, the second DRX On Duration timer corresponding to the second BWP is started, to ensure timely data transmission.

Figure 9:
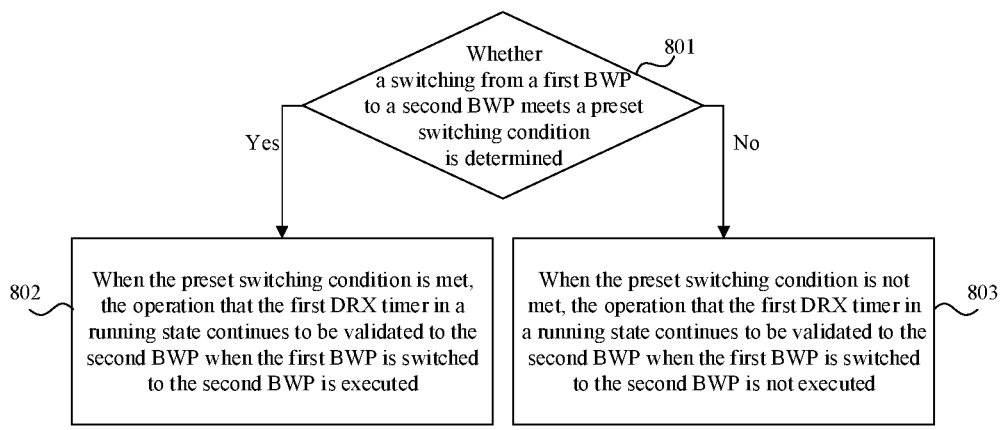
FIG. 9 is a flowchart showing that a terminal determines whether to continue to validate a first DRX timer according to a preset switching condition, according to an embodiment of the present disclosure.

Based on the embodiment described in FIG. 5, when switching from the first BWP to the second BWP, the terminal determines whether to execute the step of continuing to validate the first DRX timer according to a preset switching condition. Referring to FIG. 9, a flowchart showing that a terminal determines whether to execute the step of continuing to validate the first DRX timer according to a preset switching condition is illustrated. The method may be applied to an implementation environment shown in FIG. 3. The method includes the following steps.

In 801, whether the switching from the first BWP to the second BWP meets a preset switching condition is determined.

Alternatively, the preset switching condition includes one of the following: a bandwidth of the first BWP is less than a bandwidth of the second BWP, and the first BWP is switched to the second BWP; or, a type of the switching from the first BWP to the second BWP includes a type of switching from a default BWP or an initial BWP to another BWP.

Alternatively, the terminal obtains the preset switching condition in any one of the following three manners.

The first manner: The preset switching condition is pre-configured by an access network device through broadcast signaling or dedicated signaling, and is sent to the terminal by the access network device.

The second manner: The preset switching condition is predefined, that is, the preset switching condition is specified according to a communication protocol, and the terminal obtains the preset switching condition according to the provision of the communication protocol.

The third manner: A switching instruction sent by the access network device to the terminal carries the preset switching condition, and the terminal obtains the preset switching condition according to the switching instruction after receiving the switching instruction.

Alternatively, the manner in which the terminal obtains the preset switching condition includes, but is not limited to the above three manners, which is not limited in the embodiments.

The terminal determines whether the switching from the first BWP to the second BWP meets a preset switching condition or not. If the switching meets the preset switching condition, operations in block 802 is performed; if the switching does not meet the preset switching condition, operations in block 803 is performed.

In 802, when the preset switching condition is met, the step that when the first BWP is switched to a second BWP, the first DRX timer in a running state continues to be validated to the second BWP is executed.

When the preset switching condition is met, the step that, when the first BWP is switched to a second BWP, the first DRX timer in a running state continues to be validated to the second BWP, executed by the terminal may refer to Step 403 or Step 503, which will not be elaborated here.

In 803, when the preset switching condition is not met, the step that when the first BWP is switched to a second BWP, the first DRX timer in a running state continues to be validated to the second BWP is not executed.

When the preset switching condition is not met, the terminal does not execute the step of keeping the first DRX timer to continue to be validated to the second BWP.

In summary, in the method provided in the embodiment of the present disclosure, the type of switching from the first BWP to the second BWP is determined, the terminal can learn that the incoordination between the first DRX parameter and the second DRX parameter is more likely to occur in a switching scenario that meets the preset switching conditions, so that the terminal can selectively execute the step of continuing to validate the first DRX timer, thereby making the step performed by the terminal more flexible, without excess power consumption.

The below is a device embodiment of the present disclosure, which may be configured to execute the method embodiment of the present disclosure. Details not disclosed in the device embodiments of the present disclosure may be referred to the method embodiments of the present disclosure.

Figure 10:
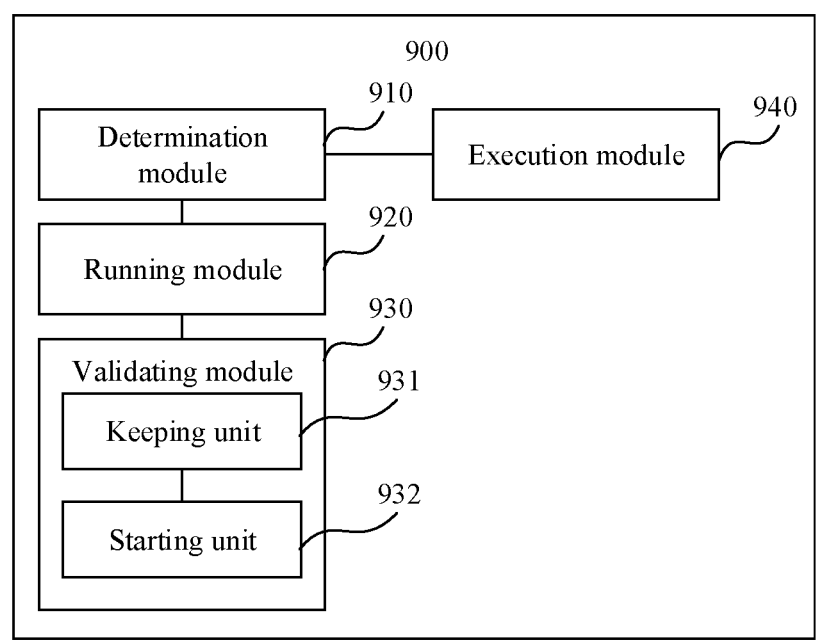
FIG. 10 is a schematic structural diagram of an apparatus for running a DRX timer according to an embodiment of the present disclosure.

FIG. 10 is a schematic structural diagram of an apparatus for running a DRX timer according to an embodiment of the present disclosure. The apparatus 900 is applied to a scenario where a first BWP and a second BWP have different DRX parameters. The apparatus includes a determination module 910, a running module 920, and a validating module 930.

The determination module 910 is configured to determine a first DRX parameter corresponding to the first BWP.

The running module 920 is configured to run a first DRX timer corresponding to the first BWP according to the first DRX parameter.

The validating module 930 is configured to, when the first BWP is switched to a second BWP, allow the first DRX timer in a running state to continue to be validated to the second BWP.

Alternatively, the validating module 930 is configured to keep the first DRX timer in a running state when switching from first BWP to the second BWP.

In an alternative implementation, the validating module 930 is configured to, when the first BWP is switched to the second BWP, keep the first DRX timer in a running state until timeout.

In another alternative implementation, the validating module 930 is configured to, when the first BWP is switched to the second BWP, keep the first DRX timer in a running state, a remaining duration of the first DRX timer being determined according to a second DRX parameter corresponding to the second BWP.

In another alternative implementation, the validating module 930 is configured to, when the first BWP is switched to the second BWP, restart the first DRX timer, a duration of the restarted first DRX timer being equal to a second duration that is determined according to a second DRX parameter corresponding to the second BWP.

Alternatively, the first DRX timer is a first DRX inactivity timer, or the first DRX timer is a first DRX HARQ RTT timer; or the first DRX timer is a first DRX retransmission timer.

In another alternative implementation, the first DRX timer is a first DRX inactivity timer.

The validating module 930 includes a keeping unit 931 and a starting unit 932.

The keeping unit 931 is configured to, when the first BWP is switched to the second BWP, keep the first DRX inactivity timer in a running state, and monitor a PDCCH before the first DRX inactivity timer expires.

The starting unit 932 is configured to start a second DRX inactivity timer corresponding to the second BWP when a scheduling grant is detected on the PDCCH. A duration of the second DRX inactivity timer is equal to a second duration that is determined according to a second DRX parameter corresponding to the second BWP.

In another alternative implementation, the first DRX timer is a first DRX On Duration timer.

The validating module 930 is configured to, when the first BWP is switched to the second BWP, keep the first DRX On Duration timer in a running state until timeout.

Or, the validating module 930 is configured to, when the first BWP is switched to the second BWP, keep the first DRX On Duration timer in a running state. When conditions of a second DRX On Duration timer that is started according to a second DRX parameter are met before timeout, a remaining duration of the first DRX On Duration timer is determined according to the second DRX parameter corresponding to the second BWP, and the second DRX parameter is a DRX parameter corresponding to the second BWP.

Or, the validating module is configured to, when the first BWP is switched to the second BWP, keep the first DRX On Duration timer in a running state, and when conditions of a second DRX On Duration timer that is started according to a second DRX parameter are met before timeout, restart the first DRX On Duration timer. A duration of the restarted first DRX On Duration timer is equal to a third duration. The third duration is determined according to a second DRX parameter corresponding to the second BWP and a running duration. The running duration is a running duration of the first DRX On Duration timer before restarting, and the second DRX parameter is a DRX parameter corresponding to the second BWP.

Alternatively, the apparatus 900 further includes an execution module 940.

The determination device 910 is configured to determine whether the switching from the first BWP to the second BWP meets a preset switching condition.

The execution module 940 is configured to, when the preset switching condition is met, execute the step that the first DRX timer in a running state continues to be validated to the second BWP when the first BWP is switched to a second BWP.

Alternatively, the preset switching condition includes that:
  a bandwidth of the first BWP is less than a bandwidth of the second BWP, and the first BWP is switched to the second BWP; or, a type of the switching from the first BWP to the second BWP includes a type of switching from a default BWP or an initial BWP to another BWP.

Alternatively, a continuous validating mode of the first DRX timer is pre-configured to the terminal by an access network device through broadcast signaling or dedicated signaling; or the continuous validating mode of the first DRX timer is predefined.

It is to be noted that, when the apparatus provided in the above embodiment realizes its DRX timer running function, the division of the above functional modules is only used as an example for illustration. In actual applications, the above functions can be assigned to different functional modules according to actual needs, that is, a content structure of the device is divided into different functional modules to complete all or part of the functions described above.

With respect to the device in the above embodiment, the specific manners for performing operations for individual modules therein have been described in detail in the embodiment regarding the method, which will not be elaborated herein.

Figure 11:
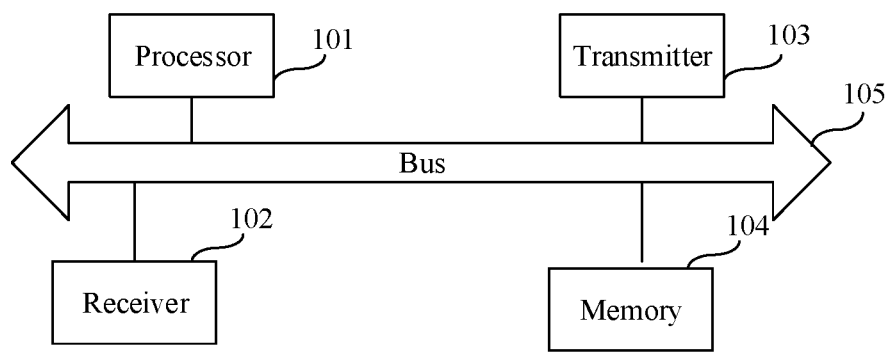
FIG. 11 is a schematic structural diagram of a terminal according to an embodiment of the present disclosure.

Referring to FIG. 11, a schematic structural diagram of a terminal according to an embodiment of the present disclosure is illustrated. The terminal includes: a processor 101, a receiver 102, a transmitter 103, a memory 104, and a bus 105.

The processor 101 includes one or more processing cores, and the processor 101 runs a software program and modules to execute various functional applications and information processing.

The receiver 102 and the transmitter 103 may be implemented as a communication component, and the communication component may be a communication chip.

The memory 104 is connected to the processor 101 through the bus 105.

The memory 104 is configured to store at least one instruction, and the processor 101 is configured to execute the at least one instruction to perform various steps performed by the terminal in the above method embodiments.

In addition, the memory 104 may be implemented by any type of volatile or non-volatile memory devices, or a combination thereof, the volatile or non-volatile memory devices include, but are not limited to, a magnetic or optical disk, an Electrically Erasable Programmable Read-Only Memory (EEPROM), an Erasable Programmable Read-Only Memory (EPROM), a Static Random Access Memory (SRAM), a Read-Only Memory (ROM), a magnetic memory, a flash memory, and a Programmable Read-Only Memory (PROM).

In an embodiment, there is also provided a computer-readable storage medium. The computer-readable storage medium is a non-transitory computer-readable storage medium. A computer program is stored in the computer-readable storage medium. The stored computer program is executed by a processing component to implement the DRX timer running method provided in the above embodiments of the present disclosure.

The embodiments of the present disclosure also provide a computer program product having stored therein one or more instructions that, when executed by a computer, cause the computer to perform the DRX timer running method provided in the embodiments of the present disclosure.

The embodiments of the present disclosure also provide a chip, which includes a programmable logic circuit and/or one or more program instructions and may run to execute the DRX timer running method provided in the embodiments of the present disclosure.

The technical solutions provided in the embodiments of the present disclosure may at least have the following beneficial effects.

When the terminal switches from the first BWP to the second BWP, the first DRX timer in a running state continues to be validated to the second BWP, so that the terminal can avoid the problem of data transmission delay caused by incoordination of the DRX parameters that respectively correspond to the two BWPs when performing BWP switching, thereby ensuring timeliness of data transmission during BWP switching.

It will be appreciated that "multiple" mentioned herein refers to two or more. "and/or" is an association between associated objects and represents that three relationships. For example, A and/or B may represent that A exists alone, A and B exist at the same time, and B exists alone. The character "/" usually indicates that previous and next associated objects form an "or" relationship.

Other implementation solutions of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for running a Discontinuous Reception (DRX) timer, comprising:
   determining a first DRX parameter corresponding to a first Band Width Part (BWP) in a scenario;
   running a first DRX timer corresponding to the first BWP according to the first DRX parameter; and
   allowing the first DRX timer in a running state to continue to be validated to a second BWP in response to determining that the first BWP is switched to the second BWP, wherein the first BWP and the second BWP have different DRX parameters in the scenario,
   wherein a continuous validating mode of the first DRX timer is pre-configured to a terminal by an access network device through broadcast signaling or dedicated signaling; or a continuous validating mode of the first DRX timer is predefined.

2. The method of claim 1, wherein allowing the first DRX timer in the running state to continue to be validated to the second BWP in response to determining that the first BWP is switched to the second BWP comprises:
   keeping the first DRX timer in the running state in response to determining that the first BWP is switched to the second BWP.

3. The method of claim 2, wherein keeping the first DRX timer in the running state in response to determining that the first BWP is switched to the second BWP comprises:
   in response to determining that the first BWP is switched to the second BWP, keeping the first DRX timer in the running state until the first DRX timer expires.

4. The method of claim 2, wherein keeping the first DRX timer in the running state in response to determining that the first BWP is switched to the second BWP comprises:
   keeping the first DRX timer in the running state in response to determining that the first BWP is switched to the second BWP, wherein a remaining duration of the first DRX timer is determined according to a second DRX parameter corresponding to the second BWP.

5. The method of claim 2, wherein keeping the first DRX timer in the running state in response to determining that the first BWP is switched to the second BWP comprises:
restarting the first DRX timer in response to determining that the first BWP is switched to the second BWP, wherein a duration of the restarted first DRX timer is equal to a second duration determined according to a second DRX parameter corresponding to the second BWP.

6. The method of claim 2, wherein the first DRX timer is a first DRX inactivity timer; and
wherein keeping the first DRX timer in the running state in response to determining that the first BWP is switched to the second BWP comprises:
in response to determining that the first BWP is switched to the second BWP, keeping the first DRX inactivity timer in a running state, and monitoring a Physical Downlink Control Channel (PDCCH) before the first DRX inactivity timer expires; and
starting a second DRX inactivity timer corresponding to the second BWP in response to detecting a scheduling grant on the PDCCH, wherein a duration of the second DRX inactivity timer is equal to a second duration determined according to a second DRX parameter corresponding to the second BWP.

7. The method of claim 1, wherein the first DRX timer is a first DRX On Duration timer; and
wherein allowing the first DRX timer in the running state to continue to be validated to the second BWP in response to determining that the first BWP is switched to the second BWP comprises:
in response to determining that the first BWP is switched to the second BWP, keeping the first DRX On Duration timer in a running state until the first DRX On Duration timer expires; or
keeping the first DRX On Duration timer in a running state in response to determining that the first BWP is switched to the second BWP, wherein in response to determining that existence conditions of a second DRX On Duration timer started according to a second DRX parameter are met before the first DRX On Duration timer expires, a remaining duration of the first DRX On Duration timer is determined according to the second DRX parameter corresponding to the second BWP, and the second DRX parameter is a DRX parameter corresponding to the second BWP; or
keeping the first DRX On Duration timer in a running state in response to determining that the first BWP is switched to the second BWP, and restarting the first DRX On Duration timer in response to determining that existence conditions of a second DRX On Duration timer started according to a second DRX parameter are met before the first DRX On Duration timer expires, wherein a duration of the restarted first DRX On Duration timer is equal to a third duration, the third duration is determined according to a second DRX parameter corresponding to the second BWP and a running duration, the running duration is a running duration of the first DRX On Duration timer before restarting, and the second DRX parameter is a DRX parameter corresponding to the second BWP.

8. The method of claim 1, wherein
the first DRX timer is a first DRX inactivity timer; or
the first DRX timer is a first DRX Hybrid Automatic Repeat Request Round-Trip Time (DRX HARQ RTT) timer; or
the first DRX timer is a first DRX retransmission timer.

9. The method of claim 1, further comprising:
determining whether a switching from the first BWP to the second BWP meets a preset switching condition; and
in response to determining that the preset switching condition is met, allowing the first DRX timer in the running state to continue to be validated to the second BWP in response to determining that the first BWP is switched to the second BWP.

10. The method of claim 9, wherein the preset switching condition comprises that:
a bandwidth of the first BWP is less than a bandwidth of the second BWP, and the first BWP is switched to the second BWP; or
a type of the switching from the first BWP to the second BWP comprises a type of switching from a default BWP or an initial BWP to another BWP.

11. A terminal, comprising:
a processor;
a non-transitory storage coupled to the processor; and
a plurality of programs stored in the non-transitory storage that, when executed by the processor, cause the processor to:
determine a first Discontinuous Reception (DRX) parameter corresponding to a first Band Width Part (BWP) in a scenario;
run a first DRX timer corresponding to the first BWP according to the first DRX parameter; and
allow the first DRX timer in a running state to continue to be validated to a second BWP in response to determining that the first BWP is switched to the second BWP, wherein the first BWP and the second BWP have different DRX parameters in the scenario,
wherein a continuous validating mode of the first DRX timer is pre-configured to a terminal by an access network device through broadcast signaling or dedicated signaling; or a continuous validating mode of the first DRX timer is predefined.

12. The terminal of claim 11, wherein the processor is configured to keep the first DRX timer in the running state in response to determining that the first BWP is switched to the second BWP.

13. The terminal of claim 12, wherein the processor is configured to, in response to determining that the first BWP is switched to the second BWP, keep the first DRX timer in the running state until the first DRX timer expires.

14. The terminal of claim 12, wherein the processor is configured to keep the first DRX timer in the running state in response to determining that the first BWP is switched to the second BWP, wherein a remaining duration of the first DRX timer is determined according to a second DRX parameter corresponding to the second BWP.

15. The terminal of claim 12, wherein the processor is configured to restart the first DRX timer in response to determining that the first BWP is switched to the second BWP, wherein a duration of the restarted first DRX timer is equal to a second duration determined according to a second DRX parameter corresponding to the second BWP.

16. The terminal of claim 12, wherein the first DRX timer is a first DRX inactivity timer; and
wherein the processor is further configured to:
in response to determining that the first BWP is switched to the second BWP, keep the first DRX inactivity timer in a running state, and monitor a Physical Downlink Control Channel (PDCCH) before the first DRX inactivity timer expires; and start a second DRX inactivity timer corresponding to the second BWP in response to detecting a scheduling grant on the PDCCH, wherein a duration of the second DRX inactivity timer is equal to a second duration determined according to a second DRX parameter corresponding to the second BWP.

17. The terminal of claim 11, wherein the first DRX timer is a first DRX On Duration timer; and wherein the processor is configured to, in response to determining that the first BWP is switched to the second BWP, keep the first DRX On Duration timer in a running state until the first DRX On Duration timer expires;

or, the processor is configured to keep the first DRX On Duration timer in a running state in response to determining that the first BWP is switched to the second BWP, wherein in response to determining that existence conditions of a second DRX On Duration timer started according to a second DRX parameter are met before the first DRX On Duration timer expires, a remaining duration of the first DRX On Duration timer is determined according to the second DRX parameter corresponding to the second BWP, and the second DRX parameter is a DRX parameter corresponding to the second BWP;

or, the processor is configured to keep the first DRX On Duration timer in a running state in response to determining that the first BWP is switched to the second BWP, and restart the first DRX On Duration timer in response to determining that existence conditions of a second DRX On Duration timer started according to a second DRX parameter are met before the first DRX On Duration timer expires, wherein a duration of the restarted first DRX On Duration timer is equal to a third duration, the third duration is determined according to a second DRX parameter corresponding to the second BWP and a running duration, the running duration is a running duration of the first DRX On Duration timer before restarting, and the second DRX parameter is a DRX parameter corresponding to the second BWP.

18. The terminal of claim 11, wherein the first DRX timer is a first DRX inactivity timer; or the first DRX timer is a first DRX Hybrid Automatic Repeat request Round-Trip Time (DRX HARQ RTT) timer; or the first DRX timer is a first DRX retransmission timer.

19. The terminal of claim 11, wherein the processor is further configured to:

determine whether a switching from the first BWP to the second BWP meets a preset switching condition; and in response to determining that the preset switching condition is met, allow the first DRX timer in the running state to continue to be validated to the second BWP in response to determining that the first BWP is switched to the second BWP.

* * * * *